United States Patent
Murai et al.

(10) Patent No.: US 10,267,219 B2
(45) Date of Patent: Apr. 23, 2019

(54) ENGINE SYSTEM

(71) Applicant: YANMAR CO., LTD., Osaka-shi (JP)

(72) Inventors: Susumu Murai, Osaka (JP); Akihiro Nagao, Osaka (JP); Hiroyuki Okada, Osaka (JP)

(73) Assignee: YANMAR CO., LTD., Osaka (JP)

( * ) Notice: Subject to any disclaimer, the term of this patent is extended or adjusted under 35 U.S.C. 154(b) by 131 days.

(21) Appl. No.: 14/809,505

(22) Filed: Jul. 27, 2015

(65) Prior Publication Data

US 2016/0040593 A1  Feb. 11, 2016

(30) Foreign Application Priority Data

Aug. 5, 2014 (JP) ................................. 2014-159296

(51) Int. Cl.
| | |
|---|---|
| *F02B 63/04* | (2006.01) |
| *F01P 3/18* | (2006.01) |
| *F01P 3/20* | (2006.01) |
| *F28F 9/22* | (2006.01) |
| *F01P 11/04* | (2006.01) |
| *F25B 27/02* | (2006.01) |
| *F01P 5/04* | (2006.01) |

(52) U.S. Cl.
CPC .............. *F02B 63/044* (2013.01); *F01P 3/18* (2013.01); *F01P 3/20* (2013.01); *F01P 5/04* (2013.01); *F01P 11/04* (2013.01); *F25B 27/02* (2013.01); *F28F 9/22* (2013.01); *Y02E 20/14* (2013.01)

(58) Field of Classification Search
CPC .............. F02B 63/044; F01P 3/18; F01P 3/20
See application file for complete search history.

(56) References Cited

U.S. PATENT DOCUMENTS

| | | | | |
|---|---|---|---|---|
| 3,566,142 A | * | 2/1971 | Dabell | F02B 63/04 290/1 R |
| 8,890,340 B2 | * | 11/2014 | Honkanen | F02B 63/044 123/2 |

(Continued)

FOREIGN PATENT DOCUMENTS

| | | | | |
|---|---|---|---|---|
| CN | 1786620 A | * | 6/2006 | ............... F25B 27/02 |
| GB | 2507811 A | * | 5/2014 | ......... E04H 12/2269 |

(Continued)

OTHER PUBLICATIONS

JPH0612730U—Machine Translation, retrieved on Mar. 2017.*

(Continued)

*Primary Examiner* — Len Tran
*Assistant Examiner* — Jenna M Hopkins
(74) *Attorney, Agent, or Firm* — Norton Rose Fulbright US LLP

(57) ABSTRACT

The internal space of a package is divided by a midlevel wall into a top compartment and a bottom compartment. The top compartment is further divided to provide a radiator chamber that accommodates a radiator and a radiator fan. The midlevel wall has a spatial connection port that spatially connects the radiator chamber and the bottom compartment. There is provided a spatial connection port cover that hangs over the spatial connection port, but that is open sideways. The radiator is disposed to face the radiator fan from below. The radiator has one of sides (e.g., a left frame portion) thereof supported by a spatial connection port cover.

20 Claims, 6 Drawing Sheets

(56) References Cited

U.S. PATENT DOCUMENTS

| | | | | |
|---|---|---|---|---|
| 2006/0054113 | A1* | 3/2006 | Yasuda | F02B 63/04 123/41.65 |
| 2011/0056453 | A1 | 3/2011 | Ono et al. | |
| 2012/0187679 | A1* | 7/2012 | Takita | F02B 63/04 290/2 |
| 2015/0111423 | A1* | 4/2015 | Broere | B60L 11/1825 439/527 |
| 2015/0292435 | A1* | 10/2015 | Yamanaka | F02B 63/044 60/670 |
| 2016/0040565 | A1* | 2/2016 | Murai | F01M 11/0004 248/311.2 |
| 2016/0043611 | A1* | 2/2016 | Ikeda | F02B 63/044 290/1 A |
| 2016/0090893 | A1* | 3/2016 | Ikeda | F01P 1/06 165/51 |

FOREIGN PATENT DOCUMENTS

| | | | | |
|---|---|---|---|---|
| GB | 2507822 A * | 5/2014 | | F02B 63/044 |
| JP | H01-056526 Y | 4/1989 | | |
| JP | H0454226 A1 * | 2/1992 | | |
| JP | 0612730 U * | 2/1994 | | F02B 63/04 |
| JP | 0612730 U * | 2/1994 | | F02B 63/04 |
| JP | H07305872 A * | 11/1995 | | |
| JP | H0814693 A * | 1/1996 | | |
| JP | H0814697 A | 1/1996 | | |
| JP | 2739186 B2 | 4/1998 | | |
| JP | 2001116296 A * | 4/2001 | | |
| JP | 3345627 B2 * | 11/2002 | | |
| JP | 3656141 B2 * | 6/2005 | | |
| JP | 2007104737 A | 4/2007 | | |
| JP | 2009168420 A * | 7/2009 | | |
| JP | 2009168420 A1 * | 7/2009 | | |
| JP | 2009-270488 A | 11/2009 | | |
| JP | 5303183 B2 | 10/2013 | | |
| JP | WO 2015146343 A1 * | 10/2015 | | F02B 63/04 |
| WO | 2009/136556 A1 | 11/2009 | | |

OTHER PUBLICATIONS

CN 1786620 A—Machine Translation, retrieved on Mar. 2017.*
CN 1786620 A—Patent Images, retrieved on Mar. 2017.*
JPH0612730U—Machine Translation English, Retrieved Mar. 2017.*
JP 3345627 B2—Machine Translation English, Retrieved Jun. 2017.*
JPH0875306A( Corresponding to JP3656141B2) English Machine Translation—Retrieved Nov. 2017.*
JP2001116296A English Machine Translation—Retrieved Nov. 2017.*
JPH0814693A English Machine Translation—Retrieved Nov. 2017.*
JPH07305872A English Machine Translation—Retrieved Nov. 2017.*
JPH0454226A English Machine Translation—Retrieved Apr. 2018.*
JP2009168420A English Machine Translation—Retrieved Nov. 2017.*
Office Action, of the Japanese Patent Office, dated Jan. 9, 2018, issued in corresponding Japanese Patent Application No. 2014-159296.

* cited by examiner

ENGINE SYSTEM

CROSS REFERENCE TO RELATED APPLICATIONS

This application is related to co-pending application: "ENGINE SYSTEM" filed even date herewith in the names of Tomoyuki Ikeda, Satoshi Abe, and Yosuke Tahara, which claims priority to Japanese Application No. 2014-159293, filed Aug. 5, 2014; "ENGINE SYSTEM" filed even date herewith in the names of Tomoyuki Ikeda, Satoshi Abe, and Yosuke Tahara, which claims priority to Japanese Application No. 2014-159294, filed Aug. 5, 2014; and "ENGINE SYSTEM" filed even date herewith in the names of Susumu Murai, Akihiro Nagao and Hiroyuki Okada, which claims priority to Japanese Application No. 2014-159295, filed Aug. 5, 2014; which applications are assigned to the assignee of the present application and all three incorporated by reference herein.

CROSS-REFERENCE TO RELATED APPLICATION (FOR U.S. APPLICATION ONLY)

The present application hereby claims priority under 35 U.S.C. § 119 on Japanese Patent Application, Tokugan, No. 2014-159296 filed Aug. 5, 2014 in Japan, the entire contents of which are hereby incorporated herein by reference.

BACKGROUND OF INVENTION

Technical Field of Invention

The present invention relates in general to cogeneration devices and other like engine systems containing an engine and a work machine (e.g., electric power generator or compressor) powered by the engine system in a single package and in particular to ventilation structures for the package.

Related Technology

Some conventional engine systems, such as cogeneration devices, have the internal space of their package divided by a midlevel wall into a top compartment and a bottom compartment. The bottom compartment accommodates an engine and a work machine (e.g., an electric power generator). The top compartment accommodates a radiator and a radiator fan that is disposed in the top face of the package so that air can be vented out to the space above the package.

As an example, in the package described in Patent Document 1 (Japanese Patent No. 5303183), the space below a midlevel wall is divided into an engine chamber and a device installation chamber, whereas the space above the midlevel wall is divided into a radiator chamber, an air intake chamber, and an exhaust chamber. Air in the engine chamber flows into an overlying exhaust chamber via a vent in the midlevel wall. After that, the air passes through a gallery provided in a partition wall that separates the exhaust chamber from the adjacent radiator chamber, reaching the radiator chamber.

SUMMARY OF INVENTION

In the structure of this conventional example, however, the ventilation path out of the engine chamber in the bottom compartment of the package runs through the overlying exhaust chamber and reaches the adjacent radiator chamber as described above. The path inevitably goes through the exhaust chamber in which there is provided an exhaust silencer, which likely results in an appreciable pressure loss. That leads to an increased load in driving the radiator fan, hence an increased energy loss.

Accordingly, it is an object of the present invention to reduce pressure loss in the ventilation path that runs from the engine chamber to the radiator chamber to decrease energy loss.

The present invention, conceived to achieve the object, is an engine system containing an engine and a work machine in a single package. The package has an internal space thereof divided by a midlevel wall into a top compartment and a bottom compartment. The top compartment above the midlevel wall is further divided to provide a radiator chamber that accommodates a radiator and a radiator fan. The bottom compartment below the midlevel wall contains the engine.

The midlevel wall has a spatial connection port that spatially connects the bottom compartment and the radiator chamber. There is provided a spatial connection port cover that covers the spatial connection port from above, but that is open sideways. The radiator fan is disposed in a top face of the package facing the radiator chamber. The radiator is disposed to face the radiator fan from below. The radiator has one of sides thereof supported by the spatial connection port cover.

In the engine system in accordance with the present invention, the engine is disposed in the bottom compartment of the package. Temperature rises in the bottom compartment due to the operation of the engine. The rotation of the radiator fan that is disposed in the top face of the package vents air out of the radiator chamber. Heated air in the bottom compartment flows into the radiator chamber where pressure decreases due to the outward venting. In this process, the air in the bottom compartment flows directly into the overlying radiator chamber through the spatial connection port in the midlevel wall. The structure reduces pressure loss in the ventilation path, thereby decreasing energy loss, when compared with the conventional example (Patent Document 1) where the air in the bottom compartment is allowed to move through the exhaust chamber.

Rain water can move into the radiator chamber through openings of the radiator fan that is disposed in the top face of the package. The opening of the spatial connection port that faces the radiator chamber is covered by the spatial connection port cover from above. The structure restrains the ingress of rain water into the bottom compartment. It is also the spatial connection port cover that supports one of the sides of the radiator. In other words, the spatial connection port cover, by doubling as a support member for the radiator, can contribute to cost reduction.

That the spatial connection port cover is open "sideways" means that the spatial connection port cover is open not only to the left or right thereof, but may be open in any horizontal direction including to the front and rear. The spatial connection port cover is however preferably open in such a direction that the incoming air flow from the bottom compartment through the spatial connection port does not pass through the radiator because the air flow has elevated temperatures due to the heat discharged by the engine. In other words, the spatial connection port cover is preferably not open to a space below the radiator, but open away from the radiator.

DESCRIPTION OF EMBODIMENTS

The following will describe embodiments of the present invention in reference to drawings.

The present embodiment is an application of an energy system in accordance with the present invention to a cogeneration device 1. The cogeneration device 1 is a system that connects both an external commercial power supply from a commercial electric power system and an electric power supply from an electric power generator (via an inverter) to an electric power supply system for an electric power consuming device (load), to meet the demand for electric power by the load and that also recovers waste heat generated in power generation for later use.

Figure 1:
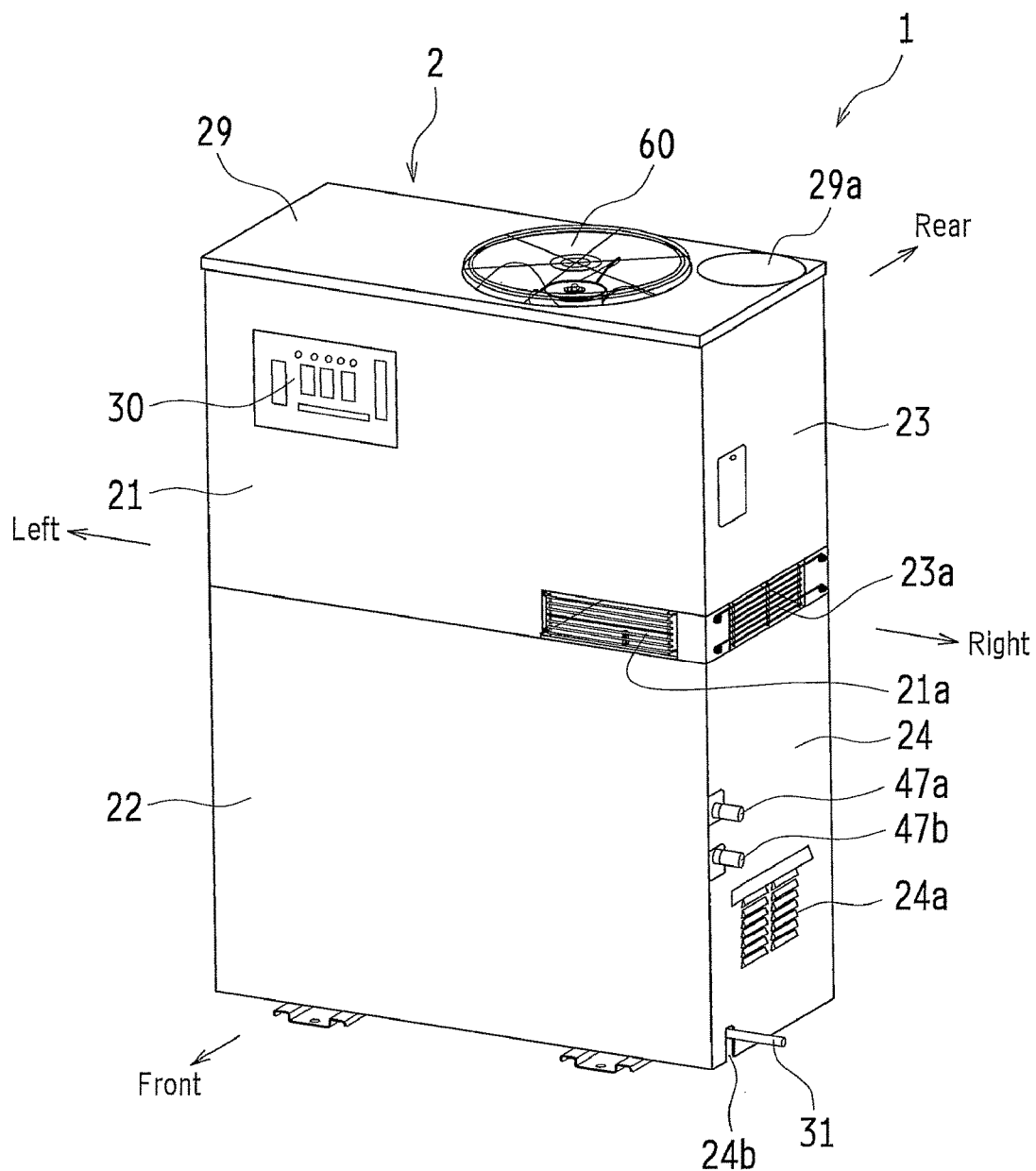
FIG. 1 is an oblique view of a cogeneration device in accordance with an embodiment of the present invention as viewed from the front.
Figure 2:
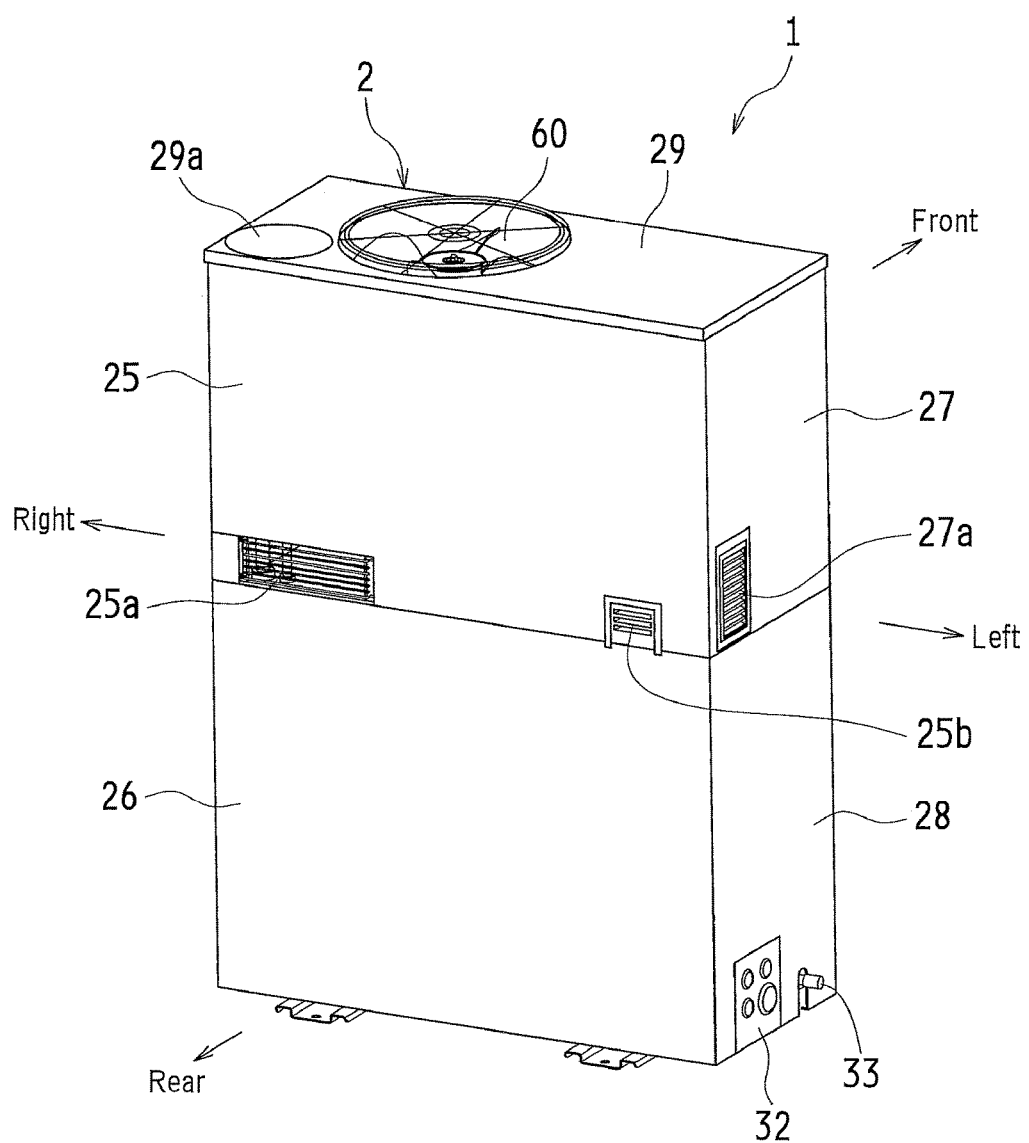
FIG. 2 is an oblique view of the cogeneration device shown in FIG. 1 as viewed from the rear.

FIGS. 1 and 2 are oblique views of the cogeneration device 1 as viewed from the front and rear respectively. As shown in FIGS. 1 and 2, the cogeneration device 1 in accordance with the present embodiment includes a package 2 as an enclosure shaped substantially like a vertically elongated rectangular parallelepiped. The package 2, in this example, has a greater dimension in the left/right direction (width) than in the front/rear direction (depth). Throughout the rest of the description, the left-hand side in FIG. 1 will be simply referred to as the left-hand side, and the right-hand side in FIG. 1 will likewise be simply referred to as the right-hand side.

More specifically, the package 2 in accordance with the present embodiment includes a frame 20 (see FIG. 3) and a plurality of panels 21 to 29. The frame 20 is composed of a steel-based material and has a rectangular base 8 (see FIG. 3) as a base component. The panels 21 to 29 are fixed to the frame 20 in such a manner that the panels 21 to 29 are individually detachable. In other words, as shown in FIG. 1, the front face of the package 2 is divided into two (i.e., upper and lower) panels 21 and 22. The right face of the package 2 is also divided into two (i.e., upper and lower) panels 23 and 24.

Likewise, as shown in FIG. 2, the rear face of the package 2 is also divided into two (i.e., upper and lower) panels 25 and 26. The left face of the package 2 is also divided into two (i.e., upper and lower) panels 27 and 28. Meanwhile, the top face of the package 2 is a single-piece top face panel 29 in which there are provided, for example, a radiator fan 60 and an engine exhaust port 29a (detailed later).

A control panel 30 is provided near the upper left corner of the upper panel 21 on the package's front face. A radiator vent 21a is provided in a right bottom part of the upper panel 21. Another radiator vent 23a is provided in a bottom part of the upper panel 23 on the package's right face. An engine ventilation gallery 24a is provided in a lower part of the lower panel 24 on the package's right face. A notch section 24b is cut out on the bottom end of the lower panel 24, close to the front. A drain hose 31 is run through the notch section 24b.

Near the right bottom corner of the upper panel 25 on the package's rear face, opposite the radiator vent 21a in the upper panel 21 on the package's front face, is there provided a like radiator vent 25a. Near the left bottom corner of the upper panel 25 is there provided an engine air intake gallery 25b. A gallery 27a is provided in a bottom part of the upper panel 27 on the package's left face, close to the rear, to introduce an inverter-cooling air flow. A power supply connector 32 and a gas supply tap 33 are provided in a bottom part of the lower panel 28 on the package's left face.

Figure 3:
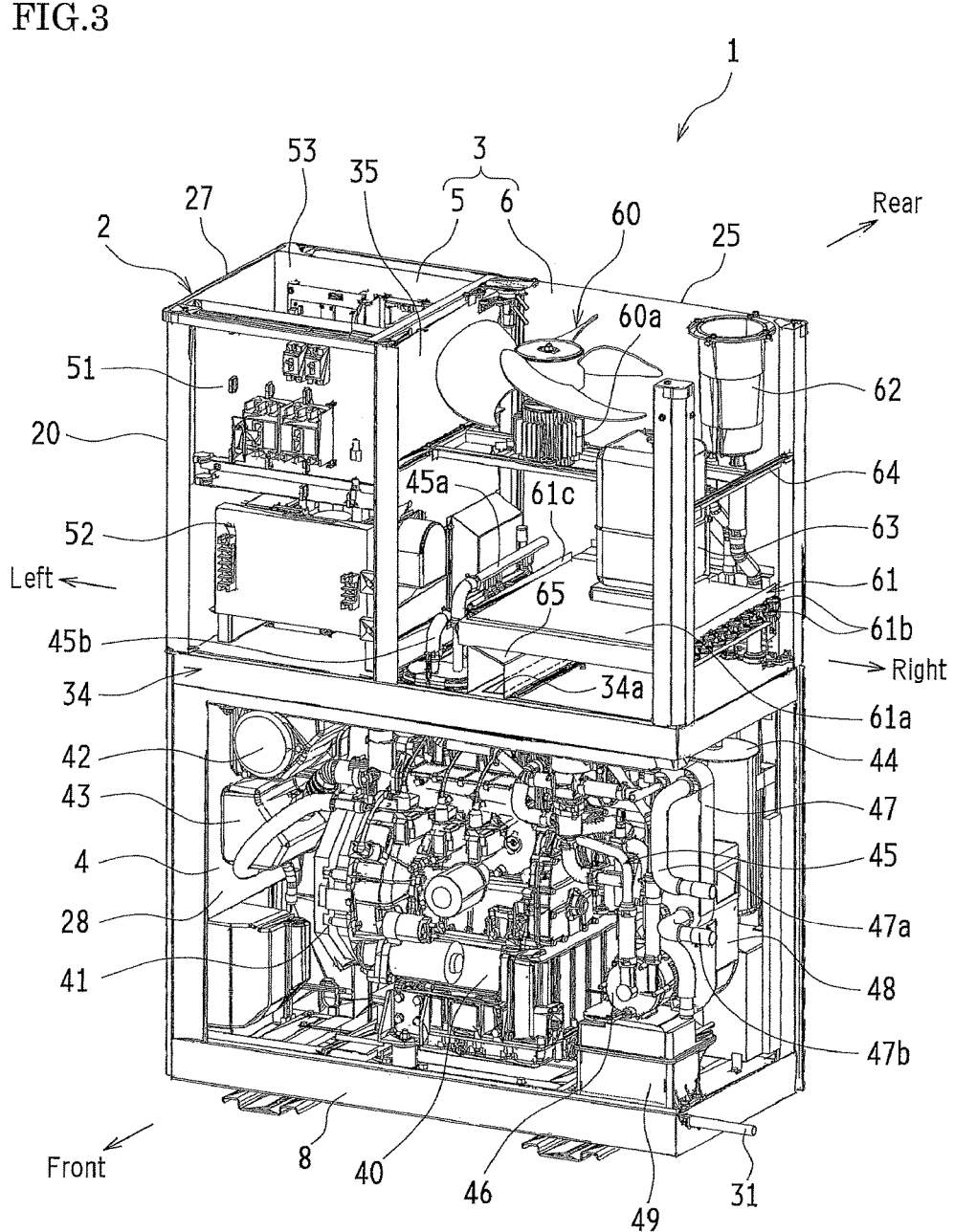
FIG. 3 is an oblique view of the cogeneration device shown in FIG. 1, illustrating the structure of the cogeneration device by removing parts of the package.

As illustrated in FIG. 3 by partially omitting the panels 21 to 29, the frame 20, and some other structural members, the internal space of the package 2 is divided into two upper and lower portions by a midlevel wall 34 located substantially halfway up from the bottom. The upper portion contains a top compartment 3, whereas the lower portion contains a bottom compartment 4. The top compartment 3 is further divided by a partition wall 35 into left and right portions. The left portion contains a device installation chamber 5, whereas the right portion contains a radiator chamber 6.

An engine 40 and an electric power generator 41 that is powered by the engine 40 are disposed substantially at the center of the bottom compartment 4. In the left-hand side of the bottom compartment 4 are there provided an air cleaner 42, an intake air silencer 43, and other air intake system components for the engine 40. Meanwhile, an exhaust system is disposed on the rear of the engine 40. An exhaust silencer 44, connected to an exhaust manifold (not shown), is disposed in the right-hand side of the bottom compartment 4, close to the rear. As an example, the engine 40 may be a gas engine.

A cooling water circuit 45 is disposed in the right-hand side of the bottom compartment 4, close to the front, so as to cool the engine 40 during operation and recover waste heat. The cooling water circuit 45 connects a water jacket of the engine 40 to a radiator 61 (detailed later) to circulate cooling water by a cooling water pump 46 and recover exhaust heat by an exhaust gas heat exchanger (not shown).

The waste heat thus recovered may be reused by a water/water heat exchanger 47 as a heat source for a water heater or like system that is out of the view. The water/water heat exchanger 47 is connected to the cooling water circuit 45. More specifically, a water supply tube 47a and a waste water tube 47b, both connected to the water/water heat exchanger 47, extend through the lower panel 24 on the package's right face and project out of the package 2 as illustrated in FIG. 1, so that piping from, for example, a water heater can be connected to the water supply tube 47a and the waste water tube 47b.

An air intake fan 48 is disposed so as to be interposed between the cooling water circuit 45 and the exhaust silencer 44, to draw outside air into the bottom compartment 4 for ventilation. The air intake fan 48 operates in synchronism with the cooling water pump 46. The air intake fan 48 draws outside air through the gallery 24a in the lower panel 24 on the package's right face and through an air intake duct (not shown) and blows out the air at the bottom of the bottom compartment 4.

A drain water filter 49 is disposed in the right-hand side of the bottom compartment 4, close to its front lower part, below the cooling water circuit 45 and the cooling water pump 46. The drain water filter 49 recovers condensed water separated out of the exhaust of the engine 40 in a mist separator 62 (detailed later) and neutralizes its acidic content by calcite. The neutralized drain water is discharged from the package through the drain hose 31.

While the lower portion of the package 2 contains the bottom compartment 4 alone as mentioned above, the top compartment 3, located above the midlevel wall 34, is divided into the device installation chamber 5 and the radiator chamber 6 as mentioned above. The left one of the chambers, or the device installation chamber 5, contains electric components to control the engine 40 and the electric power generator 41. Circuit boards 51 to 53 shown, for example, in FIG. 3 carry thereon a control circuit for the engine 40, a control circuit for an electromagnetic valve and other components of the cooling water circuit 45, and a control circuit for, among others, the cooling water pump 46, the radiator fan 60, and the air intake fan 48 respectively.

In contrast, the radiator chamber 6, located to the right of the device installation chamber 5, contains the radiator fan 60 in its top portion, i.e., through the top face panel 29 of the package 2. The radiator 61, being rectangular in a plan view, is disposed laterally (in this example, substantially horizontally) facing the radiator fan 60 from below. The radiator fan 60 is located a little off the center (to the left) of the radiator chamber 6. To the right of the radiator fan 60 are there provided the mist separator 62 and a cooling water reserve tank 63. The mist separator 62 separates water content out of the exhaust of the engine 40.

The radiator fan 60 has a main body portion 60a containing an electric motor. The main body portion 60a is supported by the frame 20 of the package 2 via a subframe 64 so that the radiator fan 60 has its rotating shaft oriented vertically. The radiator 61, disposed to face the radiator fan 60 from below, is located off the center (to the right) of the radiator chamber 6, so that the middle portion of the core 61a of the radiator 61 is displaced to the right with respect to the rotating shaft line of the radiator fan 60.

Figure 4:
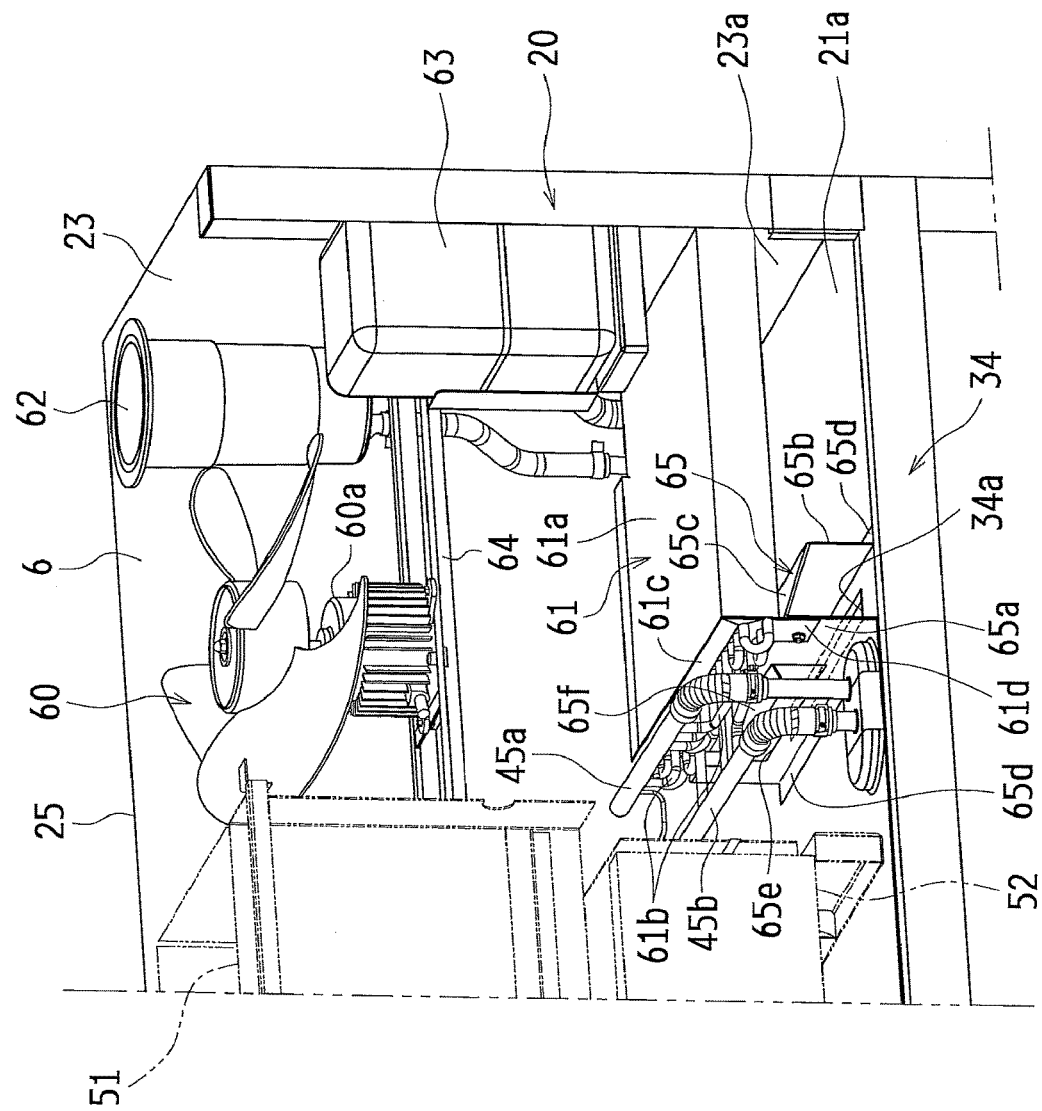
FIG. 4 is an enlarged oblique view of a support structure of a left frame portion of a radiator.

A water supply pipe 45a and a waste water pipe 45b, which are components of the cooling water circuit 45, are disposed to the left of the radiator 61 located in the right-hand side of the radiator chamber 6 and are connected to respective tubes 61b of the radiator 61 as shown also in FIG. 4. Each tube 61b is folded over in the left/right direction inside the core 61a of the radiator 61 and has an end thereof connected to the water supply pipe 45a and the other end thereof connected to the waste water pipe 45b.

Heated cooling water flows into the tubes 61b via the water supply pipe 45a, and while passing through the tubes 61b in the core 61a of the radiator 61, exchanges heat with the air passing vertically through the core 61a (radiator ventilation air) to discharge heat. The cooling water, now cooled down as a result of the heat discharge, flows out of the tubes 61b into the waste water pipe 45b and returns to the water jacket of the engine 40 through the cooling water circuit 45.

The radiator 61 is separated from the underlying midlevel wall 34 by as much as the height of the radiator vents 21a, 23a, and 25a opened respectively in the front, right, and rear faces of the package 2, in order to allow the passage of the radiator ventilation air. This structure introduces outside air via the three radiator vents 21a, 23a, and 25a into an outside air introducing space formed below the radiator 61 and subsequently passes the outside air through the core 61a upward from below (see the solid-line arrows in FIG. 6).

To support the radiator 61 above the midlevel wall 34 at a distance equal to the height of the radiator vents 21a, 23a, and 25a in this manner, the radiator 61 has a right frame portion thereof supported at its two front and rear corners by the frame 20 of the package 2. Meanwhile, the left frame portion 61c of the radiator 61 (one of sides of the radiator 61) is supported by a spatial connection port cover 65 that covers a spatial connection port 34a in the midlevel wall 34 from above as detailed below.

More specifically, referring to FIG. 4 in which the partition wall 35 is omitted, the spatial connection port 34a is opened substantially through the central portion of the midlevel wall 34 with respect to the left/right direction (in this example, a little to the right of the central portion), so that the opening is formed vertically through the midlevel wall 34, spatially connecting the bottom compartment 4 to the radiator chamber 6. The spatial connection port 34a, in this example, is elongated stretching from a neighborhood of the front edge (front-side edge) of the midlevel wall 34 to a neighborhood of the rear edge (rear-side edge) of the midlevel wall 34. The spatial connection port cover 65 is disposed so as to cover the spatial connection port 34a from above.

Figure 5:
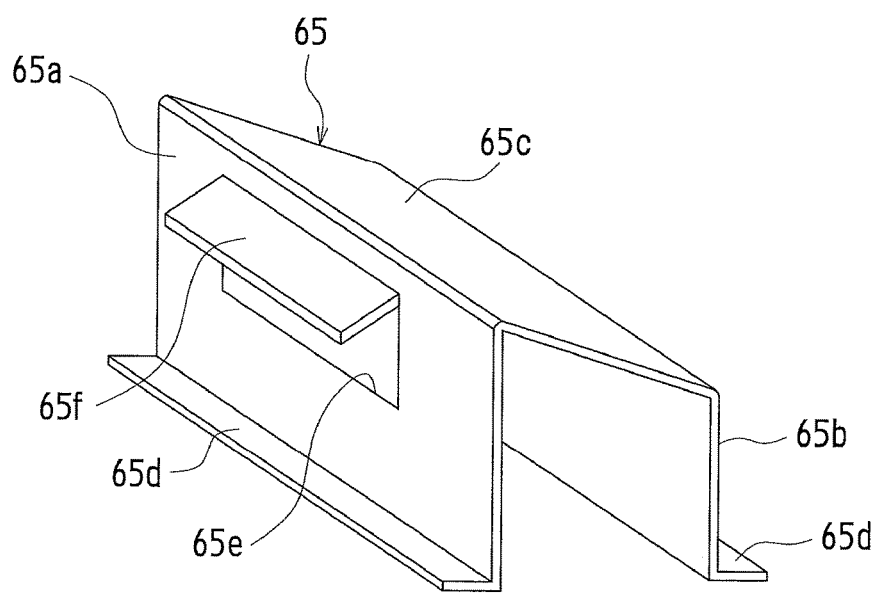
FIG. 5 is an oblique view of a spatial connection port cover shown in isolation.

As shown in isolation in FIG. 5, the spatial connection port cover 65 is, as an example, an iron plate being bent. The spatial connection port cover 65 has a pair of left and right vertical wall sections 65a and 65b, a ceiling section 65c, and flange sections 65d. The vertical wall sections 65a and 65b have different heights. The ceiling section 65c extends obliquely upward from the top edge of the lower one (65b) of the vertical wall sections (shown in the right-hand side of FIG. 5, close to the rear) to the top edge of the higher one (65a) of the vertical wall sections (shown in the left-hand side of FIG. 5, close to the front). The flange sections 65d are extensions of the respective vertical wall sections 65a and 65b so bent at the bottom edges of the vertical wall sections 65a and 65b as to extend outward.

The higher one (65a) of the vertical wall sections has a rectangular opening 65e that is elongated in the front/rear direction in the same manner as the spatial connection port 34a. The vertical wall section 65a also has a hood section 65f that is bent at the top edge of the opening 65e to extend outward. The spatial connection port cover 65 is disposed on the midlevel wall 34 to cover the spatial connection port 34a from above and has the flange sections 65d welded to the top face of the midlevel wall 34. The spatial connection port cover 65, thus welded to the midlevel wall 34, practically has a closed cross-section structure, exhibiting high support rigidity.

The spatial connection port cover 65, thus welded to the midlevel wall 34, is in contact with the front- and rear-face upper panels 21 and 25 of the package 2 respectively at the lengthwise ends thereof, that is, the front and rear ends thereof. In other words, the spatial connection port cover 65 covers the spatial connection port 34a from above and is open to the space that is to the left thereof. The spatial connection port cover 65 restrains the ingress of rain water from above into the spatial connection port 34a and guides the engine ventilation air that flows in from the bottom compartment 4 through the spatial connection port 34a to the space that is to the left of the radiator chamber 6.

As a result, as will be detailed later in reference to FIG. 6, the engine ventilation air from the bottom compartment 4 moves upward through the spatial connection port 34a, is subsequently directed obliquely toward the upper left by the slanting ceiling section 65c of the spatial connection port cover 65 and blown out of the opening 65e to the space that is to the left of the radiator chamber 6. The hood section 65f above the opening 65e has such dimensions that it can effectively prevent the ingress of rain water into the opening 65e without interfering with this air flow.

The left frame portion 61c of the radiator 61 is attached to the higher one (65a) of the vertical wall sections of the spatial connection port cover 65. Specifically, referring to FIG. 4 showing the radiator 61 and the spatial connection port cover 65 from the front side, the left frame portion 61c of the radiator 61 has support nails 61d at the front and rear ends thereof respectively. The support nails 61d extend downward and are placed and fixed to the top of the vertical wall section 65a of the spatial connection port cover 65.

The spatial connection port cover 65 serves as a support member that supports the left frame portion 61c of the radiator 61, as well as it covers the spatial connection port 34a from above to restrain the ingress of rain water from the radiator chamber 6 into the bottom compartment 4.

The cogeneration device 1 in accordance with the present embodiment is structured as detailed above. The following will primarily describe air flow in the radiator chamber 6 during the operation of the device 1, in other words, the flows of the radiator ventilation air and the engine ventilation air.

In the cogeneration device 1 in accordance with the present embodiment, as the engine 40 is warmed up, ambient temperature in the bottom compartment 4 rises due to the heat discharged by the engine 40, the electric power generator 41, etc. In response to this temperature rise, the air intake fan 48 operates to draw outside air through the gallery 24a in the lower panel 24 on the package's right face and then through the air intake duct (not shown) and blow out the air at the bottom of the bottom compartment 4.

The heated cooling water flowing out of the water jacket of the engine 40 during its operation moves through the exhaust gas heat exchanger of the cooling water circuit 45 where waste heat is recovered from high temperature exhaust, before being delivered to the water/water heat exchanger 47 or the radiator 61. The heated, hot cooling water is delivered to the water/water heat exchanger 47 on a request from the water heater, for example, and exchanges heat with warm water to give hot water. After being cooled down by the heat exchange, the cooling water is returned to the water jacket of the engine 40.

Where there is no request from the water heater and other members, the heated cooling water is delivered to the radiator 61 where the cooling water discharges heat, which elevates ambient temperature in the radiator chamber 6. That in turn causes the radiator fan 60 to rotate, thereby increasing the flow rate of the air passing through the radiator 61 (quantity of ventilation air). For example, in response to an incoming signal from a temperature sensor in the radiator chamber 6, the control circuit outputs a drive instruction to the electric motor of the radiator fan 60 to start up the electric motor.

The rotation of the radiator fan 60 discharges the air below the radiator fan 60, or the air in an upper portion of the radiator chamber 6, to the space above the package 2, generating negative pressure in the radiator chamber 6. The negative pressure moves air through the core of the radiator 61 (hereinafter, the "radiator core 61a") and draws the air upward. Hence, as indicated by solid-line arrows in FIG. 6, outside air is fed to the outside air introducing space below the radiator 61 through the radiator vents 21a, 23a, and 25a and moved upward as the radiator ventilation air.

More specifically, the air flow through the radiator vent 21a on the front side, the air flow through the radiator vent 23a on the rear side, and the air flow through the radiator vent 25a on the right side merge in the outside air introducing space below the radiator 61 and then move toward the overlying radiator core 61a. In this process, a flow that rises obliquely along the ceiling section 65c of the spatial connection port cover 65 is generated near the spatial connection port cover 65 as indicated by broken-line arrows in FIG. 6. The radiator ventilation air therefore passes through the whole cross-section of the core 61a.

Figure 6:
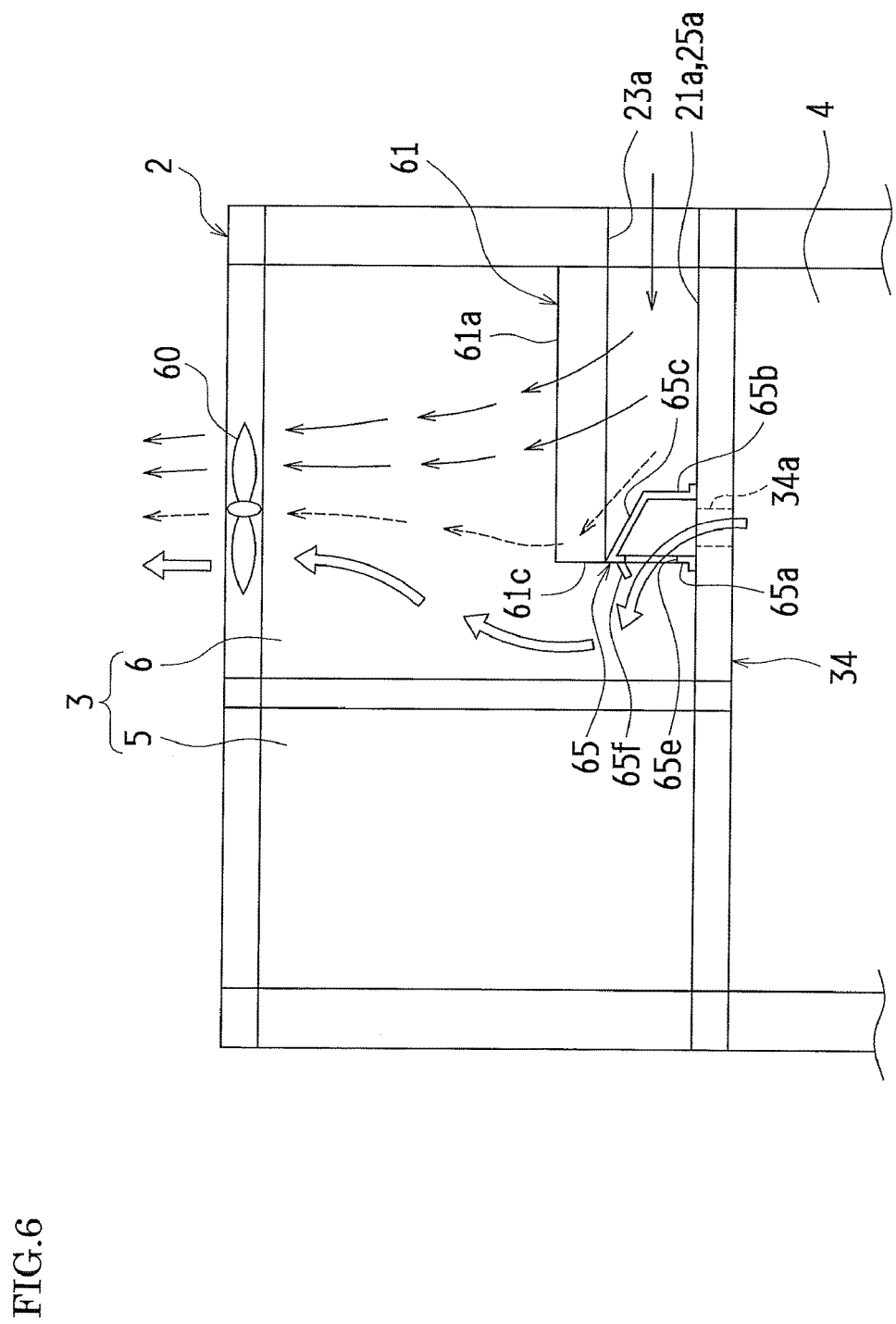
FIG. 6 is a schematic diagram primarily depicting an air flow in the radiator chamber (ventilation air flow).

In addition, the negative pressure generated in the radiator chamber 6 as mentioned above causes the air in the bottom compartment 4 to flow into the radiator chamber 6 through the spatial connection port 34a as indicated by open arrows in FIG. 6 (engine ventilation air). The engine ventilation air, hence flowing into the radiator chamber 6 from the bottom compartment 4, enhances heat discharge in the engine 40 and the electric power generator 41 and is relatively high temperature. The engine ventilation air is therefore blocked by the spatial connection port cover 65 from entering the outside air introducing space below the radiator 61.

In other words, the engine ventilation air flow from the spatial connection port 34a is blown away from the space below the radiator 61, practically not passing through the radiator core 61a. After passing through spatial connection port 34a, the engine ventilation air flow curves so smoothly along the slanting ceiling section 65c of the spatial connection port cover 65 that the curved flow produces little increase in pressure loss.

The engine ventilation air, curved by the spatial connection port cover 65, is blown obliquely upward on the left of the radiator chamber 6, thereafter moves upward along the partition wall 35, and in the space above the radiator 61, merges with the radiator ventilation air having passed through the core 61a as mentioned above. Then, the engine ventilation air is drawn by the overlying radiator fan 60 and discharged to the space above the package 2.

The cogeneration device 1 in accordance with the present embodiment hence has a structure in which the bottom compartment 4 of the package 2 containing, for example, the engine 40 and the electric power generator 41 is spatially connected directly to the overlying radiator chamber 6. The structure reduces pressure loss in the engine ventilation air path that runs from the bottom compartment 4 to the radiator chamber 6, thereby decreasing the energy loss caused by the operation of the radiator fan 60.

Besides, the engine ventilation air of relatively high temperature flowing into the radiator chamber 6 from the bottom compartment 4 is prevented from passing through the core 61a of the radiator 61. It is therefore unlikely that the cooling performance by the radiator 61 be hampered.

Rain water can move into the radiator chamber 6 through openings of the radiator fan 60 that is disposed in the top face of the package 2. The opening of the spatial connection port 34a that faces the radiator chamber 6 is however covered by the spatial connection port cover 65 from above. The structure restrains the ingress of rain water into the bottom compartment 4.

It is also the spatial connection port cover 65 that supports the left frame portion 61c of the radiator 61. There is no need to separately provide a dedicated support member. In other words, the spatial connection port cover 65, by doubling as a support member for the radiator 61, can contribute to cost reduction.

The present invention is by no means limited to the embodiment described above. As an example, in the above embodiment, the spatial connection port cover 65 hangs over the spatial connection port 34a and is open to the left (away from the space below the radiator 61). This is by no means intended to be limiting the invention. Alternatively, the spatial connection port cover 65 may be open in any horizontal direction including to the front and rear.

The top compartment 3 of the package 2, in the embodiment, is divided by the partition wall 35 into the device installation chamber 5 and the radiator chamber 6. This is again by no means intended to be limiting the invention. Alternatively, for example, the top compartment 3 of the package 2 may be divided into the radiator chamber 6 and an intake air/exhaust chamber for the engine 40. Further alternatively, the bottom compartment 4 may be further divided to provide, for example, an intake air/exhaust chamber and a device installation chamber as well as the engine chamber.

The present invention may be applied to a GHP (gas heat pump) that includes a compressor in a refrigerating circuit as a work machine powered by the engine.

The present invention is by no means limited to the embodiments described above and may be implemented in various other forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The invention claimed is:

1. An engine system comprising:
a single package having an internal space thereof divided by a midlevel wall into a top compartment and a bottom compartment,
the top compartment positioned above the midlevel wall being further divided to provide a radiator chamber that accommodates a radiator and a radiator fan, the radiator being disposed to face the radiator fan from below,
the bottom compartment positioned below the midlevel wall and including an engine and a work machine,
the midlevel wall having a spatial connection port that is configured to spatially connect the bottom compartment and the radiator chamber, and
a spatial connection port cover within the top compartment that is positioned to cover the spatial connection port from above and to maintain direct fluid communication between the top compartment and the bottom compartment, the spatial connection port cover being open sideways to define an airflow path from the bottom compartment into the radiator chamber and to the radiator fan while diverting airflow to prevent air flow from entering an outside air introducing space below the radiator, the radiator fan being disposed in at top face of the package facing the radiator chamber,
the radiator, radiator fan and spatial connection port being linearly disposed relative to each other, and
the radiator having one side thereof supported by the spatial connection port cover.

2. The engine system as set forth in claim 1, wherein the spatial connection port cover is not open to a space below the radiator, but open away from the radiator.

3. The engine system as set forth in claim 1, further comprising:
means for attaching the radiator to the spatial connection port cover.

4. The engine system as set forth in claim 1, wherein: the spatial connection port cover comprises:
a first vertical wall; and
a second vertical wall that is parallel with the first vertical wall.

5. The engine system as set forth in claim 4, wherein: the spatial connection port is positioned between the first vertical wall and the second vertical wall.

6. The engine system as set forth in claim 4, wherein: the spatial connection port cover further comprises:

a first flange portion that extends from the first vertical wall and is coupled to the midlevel wall; and
a second flange portion that extends from the second vertical wall and is coupled to the midlevel wall.

7. The engine system as set forth in claim 6, wherein: the spatial connection port positioned between the first flange portion and the second flange portion.

8. The engine system as set forth in claim 6, wherein: the first flange portion extends in a first direction away from the spatial connection port; and
the second flange portion extends in a second direction away from the spatial connection port.

9. The engine system as set forth in claim 4, wherein: the spatial connection port cover further comprises:
a ceiling section wall coupled to the first vertical wall and the second vertical wall;
the first vertical wall having a first height; and
the second vertical wall having a second height that is larger than the first height.

10. The engine system as set forth in claim 9, wherein: wherein a plane of the ceiling section wall is at an incline from the first vertical wall to the second vertical wall.

11. The engine system as set forth in claim 10, further comprising:
means for attaching the radiator to the second vertical wall of the spatial connection port cover.

12. The engine system as set forth in claim 9, wherein: the second vertical wall includes an opening through which the airflow path from the bottom compartment passes into the radiator chamber.

13. The engine system as set forth in claim 12, wherein: the spatial connection port cover further comprises:
a hood section coupled to the second vertical wall at a position associated with a top of the opening through which the airflow path from the bottom compartment passes into the radiator chamber; and
the hood section extending away from the second vertical wall toward the midlevel wall and in a direction away from the first vertical wall.

14. The engine system as set forth in claim 13, wherein: the hood section extends away from the second vertical wall toward the midlevel wall and in a direction away from the first vertical wall.

15. An engine system comprising:
a single package comprising a plurality of external wall panels that define an internal space;
a midlevel wall positioned within the internal space and configured to divided the internal space into a top compartment associated with a radiator chamber and a bottom compartment;
a work machine positioned within the internal space;
an engine positioned within the bottom compartment;
a radiator and a radiator fan positioned within the radiator chamber of the top compartment; and
a spatial connection port cover within the top compartment and coupled to the radiator and to the midlevel wall, the spatial connection port cover configured to cover a spatial connection port, the spatial connection port cover comprises a hood section coupled to a first side wall of the spatial connection port cover at a position associated with a top of an opening of the first side wall, the hood section extending away from the first side wall toward the midlevel wall, the first side wall positioned intermediate the hood section and the spatial connection port;
wherein:

a first portion of the radiator chamber is defined by the radiator, the spatial connection port, and the midlevel wall;

the spatial connection port is positioned intermediate the first portion of the radiator chamber and a second portion of the radiator chamber; and the spatial connection port is configured to direct air from the bottom compartment to the second portion of the radiator chamber via the spatial connection port.

16. The engine system as set forth in claim 15, further comprising:

an air intake vent coupled to a side wall of the package; and a top surface of the package having an opening.

17. The engine system as set forth in claim 16, wherein:

a first air flow path includes the air intake vent, the first portion of the radiator chamber, the radiator, and the radiator fan; and a second air flow path cover includes the bottom compartment, the spatial connection port, an outlet of the spatial connection port cover, the second portion of the radiator chamber, and the opening of the top surface of the package.

18. The engine system as set forth in claim 15, wherein: the spatial connection port cover comprises:

a second side wall that is parallel with the first side wall, the spatial connection port positioned between the first side wall and the second side wall;

a first flange portion that extends from the first side wall and is coupled to the midlevel wall;

a second flange portion that extends from the second side wall and is coupled to the midlevel wall; and a ceiling section wall coupled to the first side wall and the second side wall; and the hood section extending away from the first side wall toward the midlevel wall and in a direction away from the first side wall.

19. The engine system as set forth in claim 15, wherein the spatial connection port cover is coupled to the radiator such that the spatial connection port cover supports at least a portion of the radiator.

20. The engine system as set forth in claim 15, wherein the radiator, the radiator fan, and the spatial connection port are linearly disposed relative to each other.

* * * * *